United States Patent
Oshiro

(10) Patent No.: US 7,573,376 B2
(45) Date of Patent: Aug. 11, 2009

(54) METHOD, APPARATUS AND PROGRAM FOR ALARMING ABNORMALITY IN TIRE AIR-PRESSURE

(75) Inventor: Yuji Oshiro, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 318 days.

(21) Appl. No.: 11/602,350

(22) Filed: Nov. 21, 2006

(65) Prior Publication Data

US 2007/0132568 A1 Jun. 14, 2007

(30) Foreign Application Priority Data

Dec. 12, 2005 (JP) ............... 2005-357494

(51) Int. Cl.
*B60C 23/00* (2006.01)
(52) U.S. Cl. ...................... 340/442; 340/443
(58) Field of Classification Search ............ 340/442
See application file for complete search history.

(56) References Cited

U.S. PATENT DOCUMENTS 5,900,543 A * 5/1999 Oshiro .................. 340/444

FOREIGN PATENT DOCUMENTS

| JP | 63-305011 A | 12/1988 |
|----|----|----|
| JP | 9-18114 A | 1/1997 |
| JP | 2002-211220 A | 7/2002 |
| JP | 20022211220 A * | 7/2002 |

* cited by examiner

*Primary Examiner*—Davetta W Goins
*Assistant Examiner*—Samuel J Walk
(74) *Attorney, Agent, or Firm*—Birch, Stewart, Kolasch & Birch, LLP

(57) ABSTRACT

A method, an apparatus and a program for alarming abnormality in tire air-pressure which enables to prevent issuing a erroneous alarm or no alarm when only one tire is replaced with a new tire can be provided. The method of alarming abnormality in tire air-pressure includes a step of detecting whether or not a new tire has been mounted by comparing the difference between determinate values to judge a decrease in air-pressure before and after enlargement of a diameter of the new tire with a set threshold value when solely one tire is replaced with the new tire with the use of a phenomenon that a diameter of a new tire on a vehicle enlarges after running.

6 Claims, 3 Drawing Sheets

METHOD, APPARATUS AND PROGRAM FOR ALARMING ABNORMALITY IN TIRE AIR-PRESSURE

BACKGROUND OF THE INVENTION

The present invention relates to a method, apparatus and program for alarming abnormality in tire air-pressure.

A method for alarming abnormality in tire air-pressure in accordance with the prior art in which a decrease in tire air-pressure is detected and an alarm is issued, makes use of a fact that a tire having a decreased tire air-pressure rotates faster than a tire having a normal tire air-pressure. The method for alarming abnormality in tire air-pressure detects whether or not an air-pressure in tire is decreased based on the variation of a determinate value (DELL) calculated from a rotational velocity of each tire by the following equation, and issues an alarm when it is determined that the air-pressure in any tire is decreased. In the following equation FL, FR, RL and RR represent a rotational angular velocity of the front left tire, the front right tire, the rear left tire, and the rear right tire, respectively.

$$DEL1 = ((FL+RR)/(FR+RL)-1) \times 100, \text{ or}$$

$$((FL+RR)-(FR+RL))/(FL+FR+RL+RR) \times 200$$

However, when a vehicle runs after replacing with a new tire, the rotational velocity of the new tire decreases due to an enlargement of the diameter of the new tire. As a result, in the method for alarming abnormality in tire air-pressure in accordance with the prior art there has been a case where an erroneous alarm is issued or alarm is not issued at all when the new tire is mounted on a vehicle.

In Japanese Unexamined Patent Publication No. 211220/2002, a tire discrimination apparatus and method for having a capability to discriminate a kind of tire mounted on a vehicle replacing a different kind of old tire by an initialization process, to improve accuracy of determination of a decrease in tire air-pressure, and to prevent giving an erroneous alarm or no alarm and an apparatus and method for alarming decrease in tire air-pressure with the use of the above apparatus are issued. However, that invention does not teach a method to prevent issuing an erroneous alarm or no alarm when a new tire is mounted in place of an old tire.

SUMMARY OF THE INVENTION

An object of the present invention is to provide a method, an apparatus and a program for alarming abnormality in tire air-pressure which enables to prevent issuing an erroneous alarm or no alarm when only one tire is replaced with a new tire.

An aspect of the present invention relates to a method for alarming abnormality in tire air-pressure including a step of detecting whether or not a new tire has been mounted by comparing the difference between determinate values to judge a decrease in air-pressure before and after enlargement of a diameter of the new tire with a set threshold value when only one tire is replaced with the new tire, with the use of a fact that a diameter of a new tire on a vehicle enlarges after running.

Preferably, the method for alarming abnormality in tire air-pressure includes a step of detecting whether or not a new tire is mounted, only by comparing the difference between determinate values to judge a decrease in air-pressure during a slow to medium velocity running before and after a high velocity running with a set threshold value, as the conditions for detecting a new tire in accordance with the above-mentioned step.

Another aspect of the present invention relates to an apparatus for alarming abnormality in tire air-pressure including a means of detecting whether or not a new tire has been mounted by comparing the difference between determinate values to judge a decrease in air-pressure before and after enlargement of a diameter of the new tire with a set threshold value when only one tire is replaced with the new tire, with the use of a fact that a diameter of a new tire on a vehicle enlarges after running.

Preferably, the apparatus for alarming abnormality in tire air-pressure further includes a means of detecting whether or not a new tire is mounted, only by comparing the difference between determinate values to judge a decrease in air-pressure during a slow to medium velocity running before and after a high velocity running with a set threshold value, as the conditions for detecting a new tire in accordance with the above-mentioned means.

Another aspect of the present invention relates to a program for alarming abnormality in tire air-pressure, making a computer execute the procedure of detecting whether or not a new tire has been mounted, only by comparing the difference between determinate values to judge a decrease in air-pressure before and after enlargement of a diameter of the new tire with a set threshold value when only one tire is replaced with the new tire, with the use of a fact that a diameter of a new tire on a vehicle enlarges after running.

Preferably, the program of alarming abnormality in tire air-pressure further makes a computer execute the procedure of detecting whether or not a new tire is mounted, only by comparing the difference between determinate values to judge a decrease in air-pressure during a slow to medium velocity running before and after a high velocity running with a set threshold value, as the conditions for detecting a new tire in accordance with the above-mentioned procedure.

According to the present invention, a method, an apparatus and a program for alarming abnormality in tire air-pressure makes a computer prevent issuing an erroneous alarm or no alarm when one tire is replaced with a new tire by comparing the difference between determinate values to judge a decrease in air-pressure before and after an enlargement in the diameter of the new tire with a set threshold value and detecting whether a new tire has been mounted or not.

DETAILED DESCRIPTION

Embodiment

Figure 1:
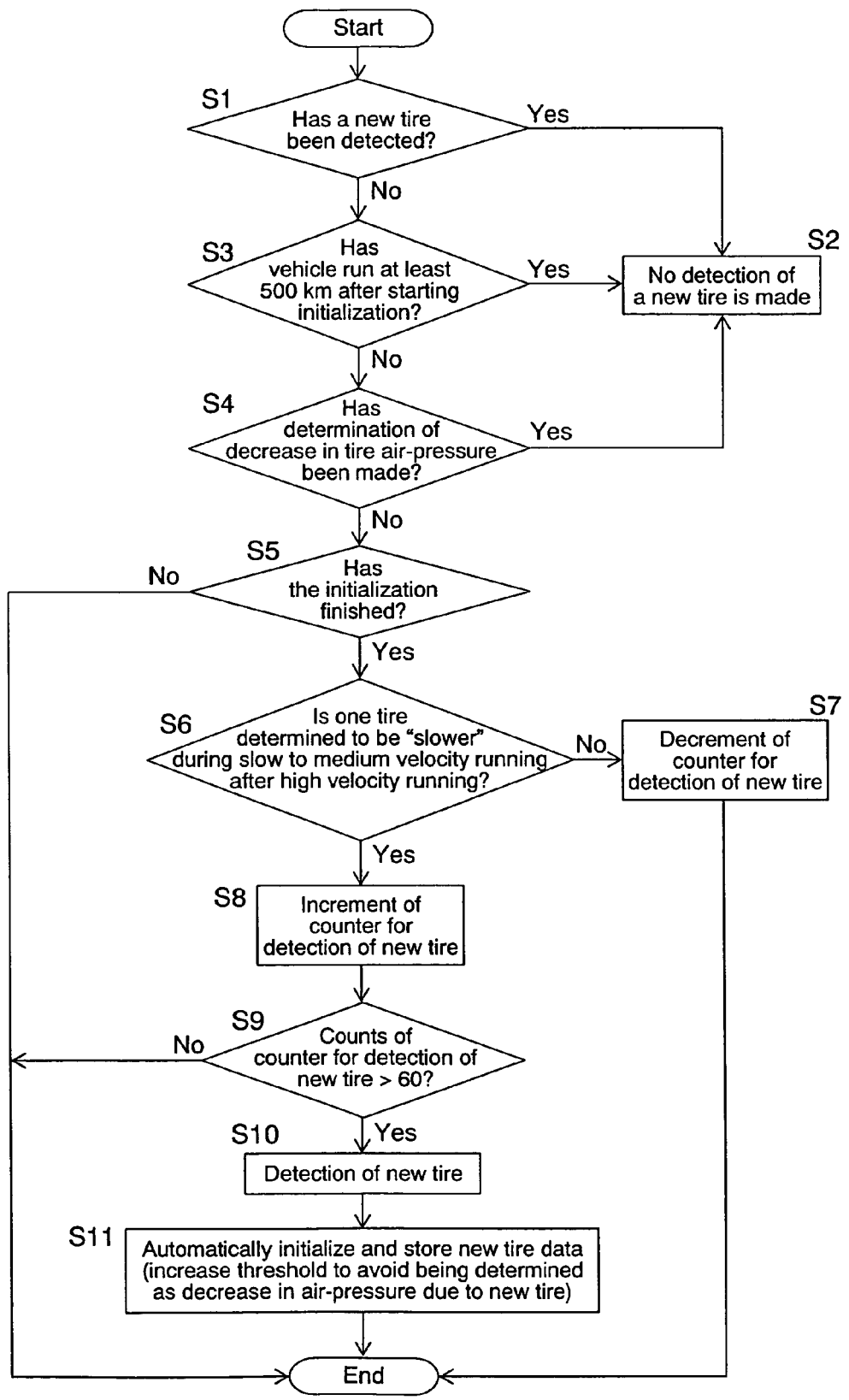
FIG. 1 is a flowchart showing an example of an embodiment of the present invention.

When a vehicle mounted on a new tire runs, the new tire subtly expands in a phase to adjust itself to a practical use, causing an enlargement in the diameter of the new tire. Thereby a rotational velocity of the new tire becomes slower than that of other tires. The method for alarming abnormality in tire air-pressure in accordance with the present invention includes a step to detect whether a new tire has been mounted or not based on determinate values to judge a decrease in air-pressure before and after the enlargement in the diameter of the new tire (hereinafter referred to as step 1).

In step 1, it is possible to detect whether a new tire has been mounted or not when only one tire is replaced with the new tire.

In step 1, when only one tire is replaced with a new tire, it is possible to detect whether the new tire has been mounted or not by calculating a determinate value to judge a decrease in air-pressure based on a rotational velocity of each tire and then comparing the difference between the determinate value before the enlargement of the diameter of the new tire (hereinafter referred to as determinate value 1) and the determinate value after the enlargement of the diameter of the new tire (hereinafter referred to as determinate value 2) with a set threshold value (hereinafter referred to as threshold value 1). In this case, if the difference between determinate value 1 and determinate value 2 exceeds threshold value 1, it is determined that a new tire has been mounted.

Those determinate values 1 and 2 may, for example, be calculated by combining the ratios of rotational velocities of the right tires to those of the left tires, the ratios of rotational velocities of the front tires to those of the rear tires, and the ratios of rotational velocities of the tires to those of the tires on respective diagonal lines. Determinate value 1 may store a condition of the new tire before the enlargement of the diameter during the initial running as a standard level (namely 0), and a deviation therefrom may be assigned to determinate value 2.

When it is detected in step 1 that a new tire has been mounted, a further step to detect whether a new tire has been mounted or not based on determinate values to judge a decrease in air-pressure during a slow to medium velocity running before and after a high velocity running is preferably implemented (hereinafter referred to as step 2). In case where only step 1 is performed, since determinate value 1 will become the same with determinate value 2 representing that the diameter of a new tire is enlarged when a biased load is applied under the slow to medium velocity running, an erroneous alarm or no alarm tends to be issued.

In step 2, it is possible to detect whether a new tire has been mounted or not by calculating a determinate value to judge a decrease in air-pressure based on a rotational velocity of each tire and then comparing the difference between the determinate value to judge a decrease in air-pressure during a slow to medium velocity running before a high velocity running (hereinafter referred to as determinate value 3) and the determinate value to judge a decrease in air-pressure after the high velocity (hereinafter referred to as determinate value 4) with a set threshold value (hereinafter referred to as threshold value 2). In this case, if the difference between determinate value 3 and determinate value 4 exceeds threshold value 2, it is determined that a new tire has been mounted.

Those determinate values 3 and values 4 may, for example, be calculated by combining determinate values (DEL 1, DEL 2 and DEL 3) represented by the difference between the two pairs of the sums of rotational velocities of tires will be calculated in accordance with the following equations. Determinate value 3 may store a condition of a new tire before enlargement of the diameter during the initial running as a standard level (namely 0), and a deviation therefrom may be assigned to determinate value 4. In the following equations FL, FR, RL, and RR represent a rotational velocity of the front left tire, the front right tire, the rear left tire, and the rear right tire, respectively.

$$DEL1 = ((FL+RR)/(FR+RL)-1) \times 100, \text{ or}$$

$$((FL+RR)-(FR+RL))/(FL+FR+RL+RR) \times 200$$

$$DEL2 = ((FL+FR)/(RL+RR)-1) \times 100, \text{ or}$$

$$((FL+FR)-(RL+RR))/(FL+FR+RL+RR) \times 200$$

$$DEL3 = ((FL+RL)/(FR+RR)-1) \times 100, \text{ or}$$

$$((FL+RL)-(FR+RR))/(FL+FR+RL+RR) \times 200$$

In calculating DEL 1, DEL 2 and DEL 3 as determinate values 3 and 4, from the relationship among a sign provided to each of DEL1, DEL2 and DEL3, a tire having a slow rotational velocity can be detected. As a result, a wheel where a new tire has been mounted can be detected. Table 1 shows tires with slower rotational velocity detected from the relationship among a sign prefixed to each DEL 1, DEL 2 and DEL 3.

TABLE 1

|  | DEL 1 | DEL 2 | DEL 3 |
| --- | --- | --- | --- |
| FR: Slower | + | − | + |
| FL: Slower | − | − | − |
| RR: Slower | − | + | + |
| RL: Slower | + | + | − |

Preferably, determinate values 1 to 4 may be obtained by moving average to stabilize the values.

In step 2, the high velocity running is preferable to be performed at a velocity in the range from 130 to 250 km/h and the slow to medium running is preferable to be performed at a velocity in the range from 15 to 130 km/h.

Step 2 to be implemented after the detection of mounting of a new tire in step 1 is preferable to be performed when tires are not under determination of a decrease in air-pressure since accurate determinate values can not be available when a decrease in air-pressure is detected. Also, step 2 is preferable to be implemented before the vehicle mounted on a new tire runs determinate distance after the start of an initialization. The determinate value is preferable to be in the range from 500 to 1000 km.

It is preferable to start the initialization after detecting a new tire in step 2. Thereafter, the initialization is preferable to be started automatically or manually by a driver, and more preferable to be started automatically. Also, when a new tire is mounted, the threshold value is preferable to be increased so as to avoid determinating erroneously a decrease in air-pressure of the new tire due to the difference between its rotational velocity and those of other tires.

The method for alarming abnormality in tire air-pressure in accordance with the present invention is a method for alarming abnormality in tire air-pressure including step 1, and preferably is a method for alarming abnormality in tire air-pressure including a method to detect a new tire including step 1. Furthermore, the method for alarming abnormality in tire air-pressure is preferable to include, in addition to steps 1 and 2, a step not to issue the alarm when a new tire is detected.

The flowchart in FIG. 1 shows an example of step to detect whether a new tire has been mounted or not based on technical items described hereinabove. The description as shown in FIG. 1 is one of the examples, and the embodiments of the present invention should not be limited to what has been specifically described herein.

At S1, determination is made as to whether a new tire is detected or not. If a new tire is detected, no detection of a new tire is made at S2 and the routine is terminated. If a new tire is not detected, the routine at S3 is implemented.

At S3, determination is made as to whether the vehicle has run at least 500 km after the start of an initialization process.

If affirmative, no detection of a new tire is made at S2 and the routine is terminated. If the vehicle runs at least 500 km, the routine at S4 is performed.

At S4, determination is made as to whether determination of a pressure decrease has been made after the start of an initialization process. If affirmative, no detection of a new tire is made at S2 and the routine is terminated. If determination of the decrease in air-pressure is not made, the routine at S5 is implemented.

At S5, determination is made as to whether the initialization process has been finished or not. If negative, the routine this time is terminated at the end and then a new process for determination is started from the start again. If affirmative, the routine at S6 is performed.

At S6, determination is made as to whether one tire is determined to be "slower" or not during a slow to medium velocity running after a high velocity running. If no tire is determined to be "slower" or the number of tires determined to be "slower" is more than one, a counter for detection of new tire is decremented at S7 and the routine of this time is terminated at the end and then a new process for determination is started from the start. And, if one tire is determined to be "slower" the counter for detection of new tire is incremented at S8, and the routine is performed at S9.

At S9, determination is made as to whether the counter for detection of new tire has counted more than 60 or not. If negative, the routine of this time is terminated at the end and then a new process for determination is started from the start. If affirmative, detection of a new tire is made at S10, and after that at S11 the initialization process is started automatically to store information on the new tire and increase the threshold value so as to prevent the erroneous alarm to be issued due to the mounting of the new tire.

EXAMPLES

The present invention will now be explained based on Examples, but it should not be construed that the present invention is limited to Examined specified herein.

Example 1

On an FR two-seated car for testing, tires of the size 245/40ZR18 (DUNLOP SPSPORTS 9000) were mounted on the front tires (as front left tire (FL) and front right tire (FR)) and tires of the size 265/35ZR (DUNLOP SPSPORTS 9000) were mounted on the rear tires (as rear left tire (RL) and rear right tire (RR)). In this case, a new tire was assigned to FL.

The above-mentioned FR car was run at 200 km/h for 300 seconds, and the ratios (FL/FR) of rotational velocities of FL to those of FR were measured during the time frame.

Figure 2:
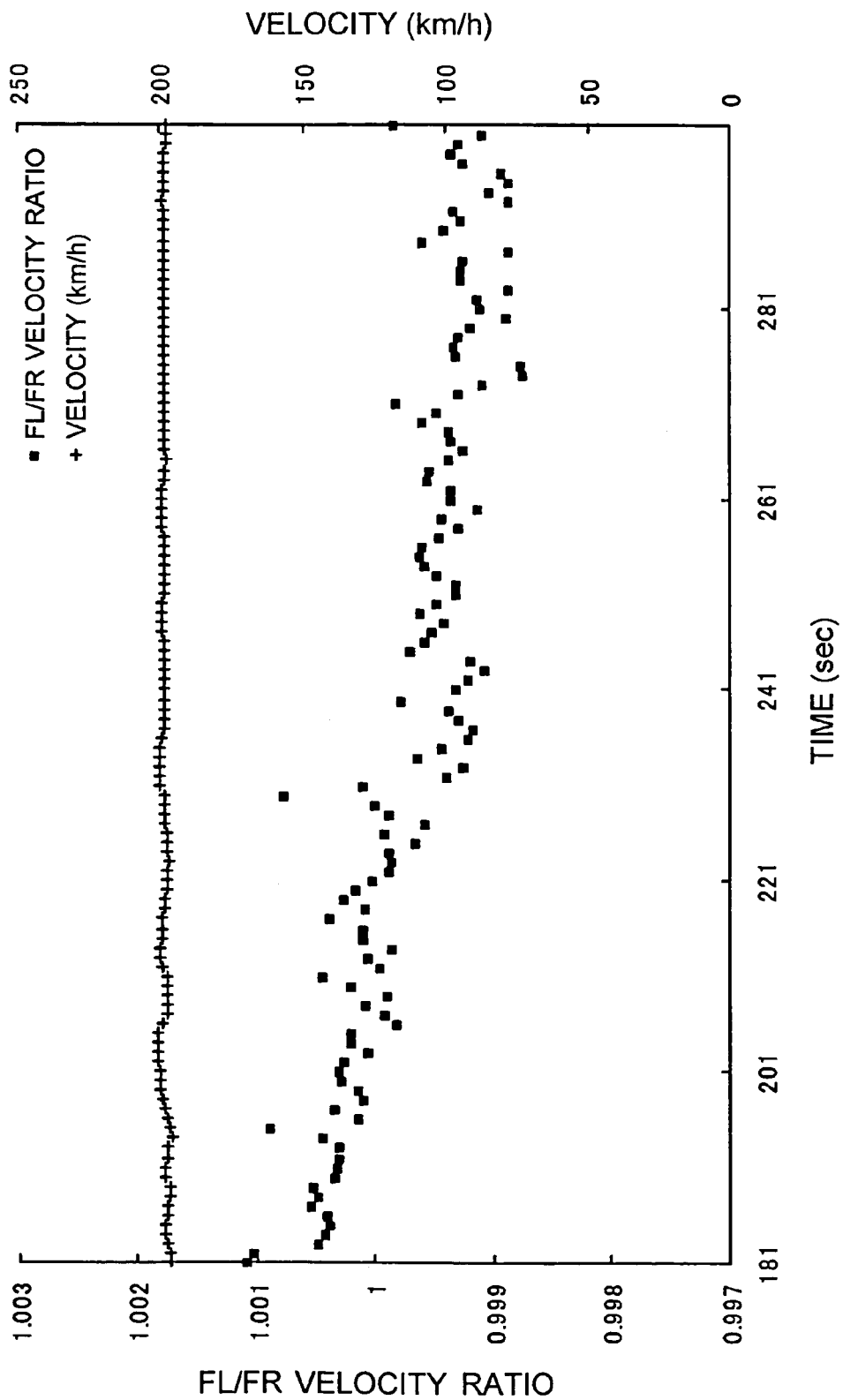
FIG. 2 is a graph showing determinate values in detecting a new tire in a first embodiment.

Measurement result of Example 1 is shown in FIG. 2.

FIG. 2 shows that the values of FL/FR decreased gradually as the rotational velocities of FL were reduced as a result of the enlargement of the diameter of FL as time goes by.

Example 2

The above-mentioned FR car was run at a speed of 80 km/h for 12 seconds (from 0 to 12 seconds). Then, the speed was raised to 200 km/h after the acceleration at 3.70 m/s$^2$ for 6 seconds (12 to 18 seconds) and the car was run for 11 seconds (18 to 29 seconds). After that, the speed was returned to 80 km/h after the deceleration at 3.70 m/s$^2$ for 6 seconds (29 to 35 seconds) and the car was run at that speed for 12 seconds (35 to 47 seconds).

During the running determinate values (DEL 1, DEL 2 and DEL 3) were measured and the counter for detection of new tire was set. In this case, the threshold value for determining a tire to be "slower" is set to be −0.09 for DEL 1, DEL 2 and DEL 3, respectively. When a rotational velocity of one tire is slower than the others based on the determinate values during a slow to medium velocity running the counter for detection of new tire was incremented, and when the counts exceeded 60 it was determined that a new tire was mounted.

Figure 3:
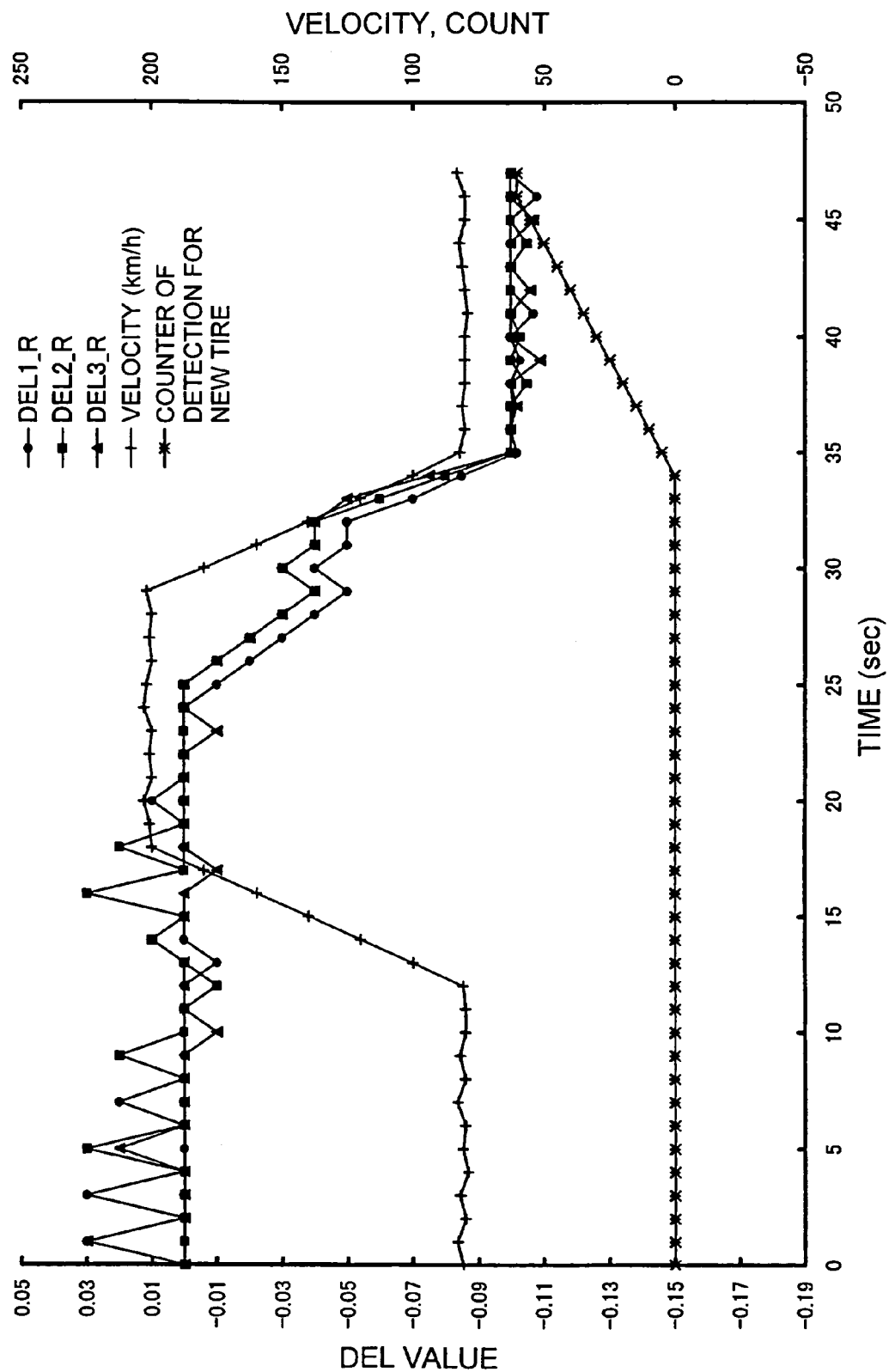
FIG. 3 is a graph showing determinate values in detecting a new tire in a second embodiment.

Measurement result of Example 2 is shown in FIG. 3.

The counter for detection of new tire started to be incremented at a point of 35 seconds and when the counts exceeded 60 at the point of 46 seconds, a new tire was detected.

Though several Embodiments of the present invention are described above, it is to be understood that the present invention is not limited only to the above-mentioned, various changes and modifications may be made in the invention without departing from the spirit and scope thereof.

What is claimed is:

1. A method for indicating abnormality in tire air-pressure of a tire mounted on a vehicle, while preventing an erroneous indication of abnormality in tire air-pressure due to a new tire mounted on the vehicle, the method comprising the steps of:

comparing rotational velocities of each tire to thereby detect an abnormal tire air pressure in one of the tires when the comparison yields a value equaling or exceeding a first threshold value; and providing an indication of the detected abnormal tire air pressure; and wherein the method further includes the steps of:

calculating a first determinate value by comparing rotational speeds of a first two pairs of tires from among the pairs of tires mounted at (1) diagonal positions on the vehicle, (2) left and right sides of the vehicle and (3) front and rear axles of the vehicle;

calculating a second determinate value by comparing rotational speeds of a second two pairs of tires that is different from the first two pairs of tires;

calculating a third determinate value by comparing rotational speeds of a third two pairs of tires that is different from each of the first two pairs of tires and the second two pair of tires;

detecting whether a new tire is mounted on the vehicle by comparing a difference in the determinate values with a second threshold value, before and after enlargement of the diameter of the new tire, based on the phenomenon that a diameter of a new tire on a vehicle enlarges after running; and adjusting the first threshold value when it is detected that a new tire has been mounted on the vehicle.

2. The method for indicating abnormality in tire air-pressure of claim 1, wherein the step of detecting whether a new tire is mounted is effected only by comparing the difference between determinate values during a slow to medium velocity running before and after a high velocity running with a set threshold value.

3. An apparatus for indicating abnormality in tire air-pressure of a tire mounted on a vehicle, while preventing an erroneous indication of abnormality in tire air-pressure due to a new tire mounted on the vehicle, the apparatus comprising:

means for comparing rotational velocities of each tire to thereby detect an abnormal tire air pressure in one of the tires when the comparison yields a value equaling or exceeding a first threshold value; and means for providing an indication of the detected abnormal tire air pressure; and wherein the method further includes the steps of:

means for calculating a first determinate value by comparing rotational speeds of a first two pairs of tires from among the pairs of tires mounted at (1) diagonal positions on the vehicle, (2) left and right sides of the vehicle and (3) front and rear axles of the vehicle;

means for calculating a second determinate value by comparing rotational speeds of a second two pairs of tires that is different from the first two pairs of tires;

means for calculating a third determinate value by comparing rotational speeds of a third two pairs of tires that is different from each of the first two pairs of tires and the second two pair of tires;

means for detecting whether a new tire is mounted on the vehicle by comparing a difference in the determinate values with a second threshold value, before and after enlargement of the diameter of the new tire, based on the phenomenon that a diameter of a new tire on a vehicle enlarges after running; and means for adjusting the first threshold value when it is determined that a new tire has been mounted on the vehicle.

4. The apparatus for indicating abnormality in tire air-pressure of claim 3, wherein the means for detecting whether a new tire is mounted operates solely by comparing the difference between determinate values to judge a decrease in air-pressure during a slow to medium velocity running before and after a high velocity running with a set threshold value.

5. A program, carried on a computer-readable medium, for indicating abnormality in tire air-pressure of a tire mounted on a vehicle, while preventing an erroneous indication of abnormality in tire air-pressure due to a new tire mounted on the vehicle, the program, when executed, carrying out a method comprising the steps of:

comparing rotational velocities of each tire to thereby detect an abnormal tire air pressure in one of the tires when the comparison yields a value equaling or exceeding a first threshold value; and providing an indication of the detected abnormal tire air pressure; and wherein the method further includes the steps of:

calculating a first determinate value by comparing rotational speeds of a first two pairs of tires from among the pairs of tires mounted at (1) diagonal positions on the vehicle, (2) left and right sides of the vehicle and (3) front and rear axles of the vehicle;

calculating a second determinate value by comparing rotational speeds of a second two pairs of tires that is different from the first two pairs of tires;

calculating a third determinate value by comparing rotational speeds of a third two pairs of tires that is different from each of the first two pairs of tires and the second two pair of tires;

detecting whether a new tire is mounted on the vehicle by comparing a difference in the determinate values with a second threshold value, before and after enlargement of the diameter of the new tire, based on the phenomenon that a diameter of a new tire on a vehicle enlarges after running; and adjusting the first threshold value when it is determined that a new tire has been mounted on the vehicle.

6. The program for indicating abnormality in tire air-pressure of claim 5, wherein the step of detecting whether a new tire is mounted, is effected solely by comparing the difference between determinate values during a slow to medium velocity running before and after a high velocity running with a set threshold value.

* * * * *